Inventors
Leonard Joseph Burant
Bruce Even Peterson
By Pendleton, Newman
Seibold & Williams
Attorneys

United States Patent Office

3,471,766
Patented Oct. 7, 1969

3,471,766
BATTERY HAVING CONTROLLED LIFE
Leonard Joseph Burant, Milwaukee, and Bruce Even Peterson, Waukesha, Wis., assignors to Globe-Union Inc., Milwaukee, Wis., a corporation of Delaware
Filed Sept. 16, 1965, Ser. No. 487,690
Int. Cl. H02j 7/04, 7/16
U.S. Cl. 320—51                                                5 Claims

ABSTRACT OF THE DISCLOSURE

A multicell battery having a load circuit and having one but less than all of its cells included in a shunting circuit which controls battery life. In one form the battery also includes, in series with the shunted cell or cells, both a resistance and a switch for completing the shunting circuit.

---

This invention relates to batteries having a controlled life, and, more particularly, to such batteries as are adapted to be activated by immersion in sea water for energizing sonobuoys and the like.

In accordance with conventional practices, such batteries usually include one or more cells comprising a magnesium alloy anode and a silver chloride cathode suitably spaced to permit sea water admitted through ports in the battery casing to serve as an electrolyte for activating the battery. When such batteries are employed to energize sonobuoys and the like, the devices are frequently dropped into the water from ships or aircraft to serve as navigational aids, for submarine detection, and for other similar purposes during the life of the battery. During peacetime the normal life of such batteries may not be too critical so long as it is long enough to energize the sonobuoy for the desired length of time. In time of war or hostilities, however, it is frequently imperative that such battery-operated devices continue to function only so long as required by friendly forces, since a longer period of life might reveal the presence of such forces, or be of other assistance to the enemy.

Numerous attempts have been made to provide battery-energized sonobuoys and the like which can be operated for either long or short periods of time as exigencies may require. In some instances separate batteries have been employed to provide the voltage for no longer than the desired period of time, this being the normal full life of the batteries. In other instances, means have been provided for shunting all of the cells of the battery to shorten its normal life. Devices embodying either of these alternatives, however, have proven to be exceedingly expensive and uneconomical and have exhibited poor terminal voltage characteristics. Still other devices have employed expensive timing mechanisms in the sonobuoy cricuit for disconnecting the battery, but such approaches are subject to the further disadvantages of a low total voltage and the uncertainty of circuit interruption at the desired time.

Accordingly, it is an object of this invention to provide a battery having a normally long useful life, which life may nevertheless be substantially shortened as exigencies require.

Another object of this invention is to create a deferred action sea-water battery having a normally long useful life and provision for limiting said life to a predetermined shorter period when desired.

A still further object of this invention is to provide a deferred-action battery construction which will permit its use for energizing a sonobuoy or the like for the normally long life of the battery, or, alternatively, for a predetermined shorter period, at the option of the user exercised prior to activation of the battery by immersion in sea water.

A still further object of this invention is to provide a battery-energized sonobuoy having means for limiting the normal useful life thereof to a predetermined extent.

A further object of this invention is to provide all of the foregoing objects while maintaining a relatively simple, economical and reliable battery construction.

These and other objects and advantages will be manifest from an examination of the specification, drawings and claims.

In accordance with one embodiment of the invention there is provided a mutli-cell battery comprising a shunting circuit for controlling the useful life of said battery, said shunting circuit comprising in series at least one, but less than all of the cells of said battery, a resistance and a switch for completing said circuit. The shunting circuit resistance may comprise a single resistor, which may be either fixed or variable, or a plurality of separate resistors in parallel with each other and each in series with a separate switch whereby one or more resistors may be included in the shunting circuit as desired. Optionally, the shunting circuit, except for means for controlling the switch or switches thereof, may be completely enclosed within the battery casing, the control means being mounted on the exterior of the casing for easy access thereto, or the shunting circuit, except for the shunted cells, may be exterior to the battery casing. The battery may be employed to energize a sonobuoy or the like for the full normal life of the battery when the shunting circuit is open, or for a shorter predetermined period when the shunting switch or switch are closed to complete the shunting circuit.

Reference will now be made to the accompanying drawings in which.

Figure 1:
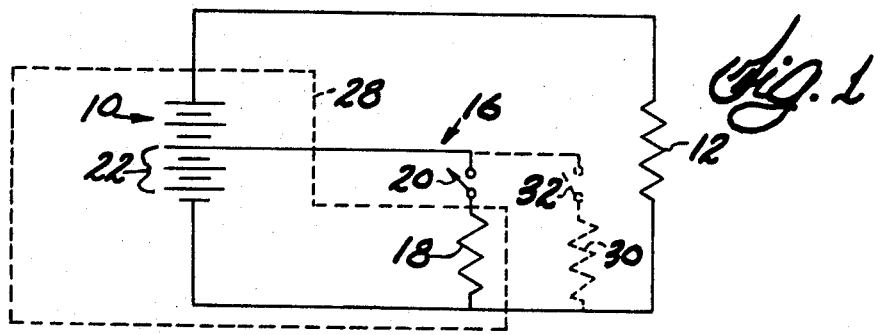
FIGURE 1 is an electrical diagram of several embodiments of the present invention.

Referring to the drawings, particularly the electrical diagram of FIG. 1, a multi-cell battery 10 is provided for energizing a load 12, which may be a sonobuoy or the like. The battery 10 may conveniently be a sea-water battery comprising magnesium alloy anodes and silver chloride cathodes suitably spaced to permit sea water admitted through ports in the battery casing 28 (shown in outline) to serve as an electrolyte for activating the battery. The capacity and total number of cells in the battery 10 may be predetermined to satisfy the requirements for operating the sonobuoy efficiently for the intended purpose, such as, for example, a voltage requirement in the order of about 15 volts for a normal useful life of eight hours.

Figure 2:
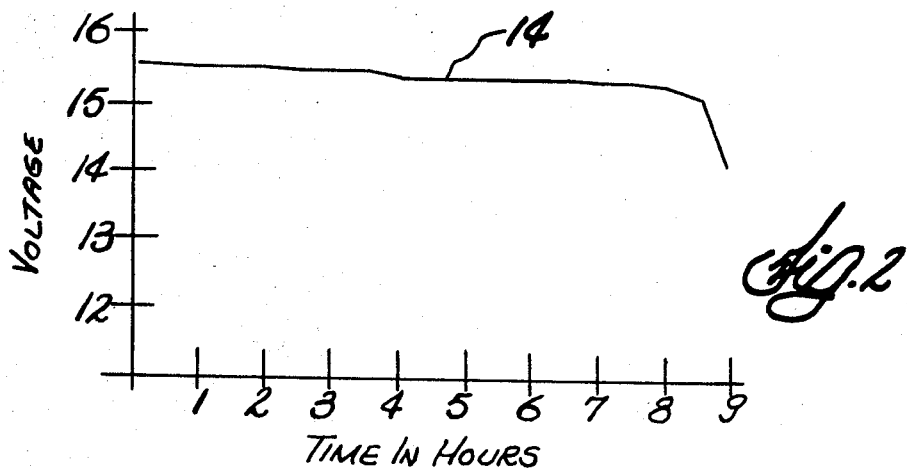
FIG. 2 is a graph illustrating certain performance characteristics of the invention when one of the switches in FIG. 1 is open.

Certain performance characteristics of a battery so designed and tested are illustrated in FIG. 2 wherein the curve 14 indicates that a voltage of approximately 15 volts required to operate the sonobuoy 12 may be maintained for a normal useful life of the battery in excess of eight hours, after which time the voltage falls off sharply with the result that the sonobuoy will no longer operate effectively. FIG. 2 thus illustrates that a multi-cell battery, such as a sea-water battery for use in a sonobuoy circuit, may be designed, for example, to provide the required operating voltage for an intended normal useful life of approximately eight hours. It will be understood, of course, that batteries according to the present invention may be designed to maintain higher or lower voltages (as the intended load may require) for a shorter or longer normal useful life as desired.

At times, however, the exigencies of the situation may make it desirable or even imperative that the sonobuoy operate efficiently for its intended purpose for a much shorter period of time than the normal full life of its energizing battery. For exemple, a battery for energizing a sonobuoy having a normal useful life of eight hours, or any other normal useful life, could, if permitted to operate at its design voltage for its full life, energize the sonobuoy for a longer time than required by friendly naval forces and thus reveal the presence of such forces, or be of other assistance to the enemy. Consequently means are provided in the battery circuit for effectively limiting or shortening the normal useful life of the battery, at the option of the user, and thus the period of time in which the sonobuoy or the like will effectively perform its function.

In order to shorten the life of the battery 10, the battery is provided, as shown in FIG. 1, with a shunting circuit 16 which comprises a resistance 18 (substantially lower than the principal load resistance 12), a switch 20, and one or more cells 22, but less than all of the cells, of the battery 10. The shunting circuit 16, except for control means for the switch 20, may be wholly enclosed within the battery casing 28, the control means being located on the exterior of the battery casing for easy access thereto. Alternatively, the entire shunting circuit 16, except for the shunted cell or cells 22, may be exterior of the battery casing.

When the switch 20 is open the shunting circuit 16 has no effect on the battery circuit, which may, as hereinbefore described, have certain performance characteristics as illustrated in FIG. 2. When the switch 20 is closed, however, to complete the shunting circuit 16, the current density in the shunted cell or cells 22 is materially increased without substantially affecting the overall battery voltage during the shortened time that the shunted battery is designed to energize the sonobuoy or the like. At the end of the predetermined shortened time, however, the battery voltage will rapidly drop below the voltage required to operate the sonobuoy. In the case of sea-water batteries having magnesium alloy anodes and silver chloride cathodes, the increase in current density in the shunted cells 22 will cause the silver chloride to be more rapidly consumed, thereby effecting a sharp drop in voltage much earlier than would be the case if the shunting circuit were left open.

Figure 3:
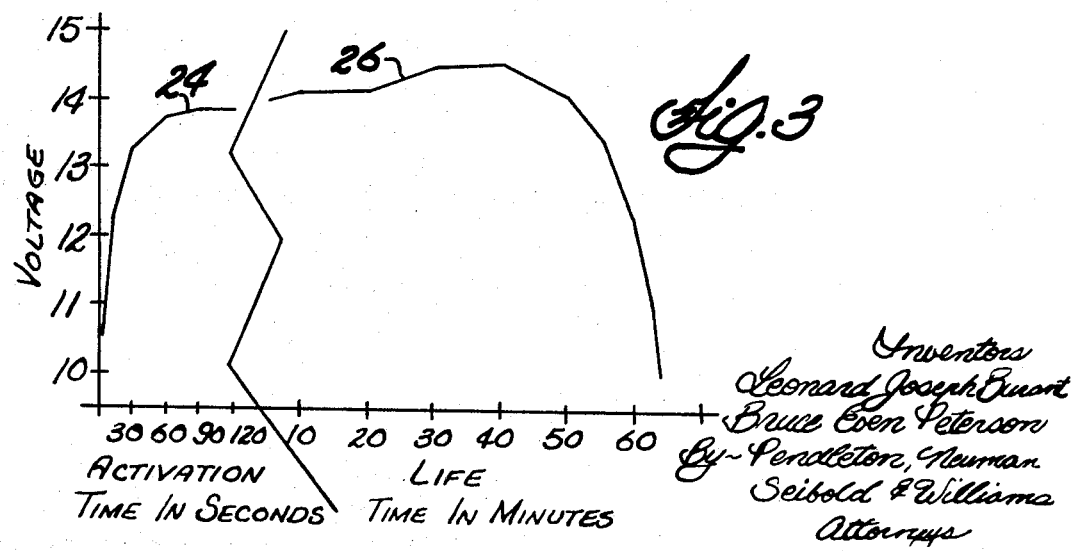
FIG. 3 is a graph illustrating certain other performance characteristics of the invention when the same switch in FIG. 1 is closed.

FIG. 3 graphically illustrates certain performance characteristics of the same battery circuit illustrated in FIG. 2, but with the switch 20 closed to complete the shunting circuit 16. In this battery circuit, wherein the sonobuoy resistance was 56 ohms and the shunt resistance 3 ohms, it was found, as shown by the curve 24, that, upon activation of the battery, no more than approximately 90 seconds was required for the overall battery voltage to reach an operating voltage of approximately 14 volts. As shown by curve 26, the shunted battery maintained a sufficient operating voltage for about one hour, after which, because of the increased current density in the shunted cells, the voltage dropped off sharply to as low as 10 volts which was insufficient for continued useful operation of the sonobuoy.

Thus it is seen that by closing the shunting switch 20 to complete the shunting circuit 16, it was possible to reduce the normal operating life of the same multi-cell battery from slightly over 8 hours to approximately one hour without materially affecting the voltage required for efficient operation of the sonobuoy for an intentionally shorter period. It is therefor apparent that by providing a shunting circuit in a battery of the type described, it is possible to substantially limit the normal useful life of a battery-energized sonobuoy or the like, at the option of the user thereof, by merely closing a shunting circuit switch to complete the shunting circuit just prior to activation of the battery.

It will be understood of course that the normal useful life of such a battery having a shunted circuit may be selectively limited by design to any predetermined shorter life by properly selecting the shunt resistance 18 and/or the number of cells, less than all of the cells of the battery, to be shunted. Thus, to increase the predetermined shorter life of the battery beyond the one-hour shortened life of the example illustrated in FIG. 3, the resistance of the shunt load 18 may be increased, or the number of shunted cells decreased, or both. Conversely, to decrease the predetermined shorter battery life, the shunt resistance 18 may be decreased, or the number of shunted cells increased, or both. However, it has been found desirable to shunt the smallest practical number of cells in the battery for optimum performance. Thereby the energy to be dissipated as heat is minimized and the characteristics exhibit the flattest normal operating voltage with the sharpest cut-off. The resistance of the shunted cell becomes extremely high and operates as an open switch at the predetermined time.

Unless the shunting circuit 16, except for the shunted cells 22, is exterior to the battery casing 28, in which case a plurality of shunting lead terminals (not shown) could be provided for alternative use to change the number of shunted cells, the number of cells in the shunting circuit will normally be fixed once the battery 10 is enclosed within the casing. However, even when the number of shunted cells 22 is fixed by the battery design, it is still possible according to this invention to provide for a wide range of predetermined shorter battery lives as may be desired. For example, the shunt resistance 18 may be variable instead of fixed, so that at the time of activation of the battery, the battery may, at the option of the user, be given any predetermined shorter life as may be effected by changes in the variable resistance over the resistance range thereof. In addition, or as an alternative, to making the shunt resistance 18 variable, one or more additional shunt resistors 30 of low resistance may be included in parallel with each other in the shunting circuit 16, as shown in FIG. 1, each such additional shunt resistor 30 being provided with a separate switch and control means 32. The additional resistors 30 may be exterior of the battery casing or, alternatively, wholly enclosed within the casing, in which event the control means 32 therefor may be located on the exterior of the casing for easy access thereto. Thus at the time of activation of the battery, the total resistance of the shunting circuit 16 may be selected from a wide range, at the option of the user, by closing one or more of the shunting switches 20 and 32 to provide for a predetermined shorter battery life from among a large number of such shorter lives.

It will thus be seen that there has been provided by this invention a battery having a shunting circuit which may, at the option of the user, be activated for a full normal life if the shunting circuit is left open, or for a shorter predetermined life, if at the time of activation, the shunting circuit is closed. It will also be seen that there has been provided a battery-energized sonobuoy circuit whereby the sonobuoy may be operated either for the full normal life of the battery, or alternatively, for a shorter predetermined period, at the option of the user.

The foregoing will so fully and completely describe the character of the present invention that others skilled at the art may, by applying current knowledge, readily adapt the same for use under varying conditions without departing from the essential features of the novelty involved, which are intended to be defined and secured by the following claims.

What is claimed is:

1. A series circuit including a multi-cell battery having a predetermined total energy and a load having a predetermined energy rate requirement such that the connection of the battery and load gives a definite normal operating life for the battery, and a shunting circuit connected at one end directly from an anode-cathode connection between adjoining cells of the battery and adapted to controllably shorten said normal operating life of the battery, said shunting circuit comprising in series at least one but less than all of the cells of said battery, a resistance and means for completing said shunting circuit.

2. A series circuit including a multi-cell sea-water battery having a predetermined total energy and a sonobuoy electrical circuit having a predetermined energy rate requirement such that the connection of the battery and sonobuoy gives a definite normal operating life for the battery, and a shunting circuit connected at one end directly from an anode-cathode connection between adjoining cells of the battery and adapted to controllably shorten said normal operating life of the battery, said shunting circuit comprising in series at least one but less than all of the cells of said battery, a resistance and a switch for completing said shunting circuit.

3. A series circuit including a multi-cell magnesium-silver chloride sea-water battery having a predetermined total energy and a load having a predetermined energy rate requirement such that the connection of the battery and load gives a definite normal operating life for the battery, and a shunting circuit connected at one end directly from an anode-cathode connection between adjoining cells of the battery and adapted to controllably shorten said normal operating life of the battery, said shunting circuit comprising in series at least one but less than all of the cells of said battery, a resistance and a switch for completing said shunting circuit.

4. A multi-cell magnesium-silver chloride sea-water battery having a predetermined total energy comprising a plurality of serially connected battery cells, an electrical load connected across said plurality of cells having a predetermined energy requirement such that the connection of the battey and load gives a definite normal operation time for the battery, and a shunting circuit connected at one end directly from an anode-cathode connection between adjoining cells of the battery and adapted to controllably shorten the normal operating life of the battery, said shunting circuit comprising in series at least one but less than all of the cells of said battery and a resistance having a predetermined value, said resistance value being such that in combination with said load, said shunted cell will be chemically exhausted prior to exhaustion of said battery as a whole, thereby determining said operating life of said battery.

5. A battery according to claim 4, said battery having a casing wholly enclosing said shunting circuit, and control means on the exterior of said casing for closing said switch.

References Cited

UNITED STATES PATENTS

| 2,675,522 | 4/1954 | Godshalk | 320—48 X |
| 3,237,078 | 2/1966 | Mallory | 320—17 |
| 3,321,690 | 5/1967 | McCarthy et al. | 320—6 |
| 1,306,539 | 6/1919 | Hellmund | 307—50 X |
| 2,244,065 | 6/1941 | Hughes et al. | 320—55 X |

JOHN F. COUCH, Primary Examiner

S. WEINBERG, Assistant Examiner

U.S. Cl. X.R.

307—52